United States Patent [19]

Ramanarayanan

[11] Patent Number: 4,820,591

[45] Date of Patent: Apr. 11, 1989

[54] CORROSION RESISTANT ARTICLE AND METHOD OF MANUFACTURE

[75] Inventor: Trikur A. Ramanarayanan, Somerset, N.J.

[73] Assignee: Exxon Research and Engineering Company, Florham Park, N.J.

[21] Appl. No.: 48,541

[22] Filed: May 11, 1987

[51] Int. Cl.4 .......................... F16L 9/14; C23C 14/06
[52] U.S. Cl. ..................................... 428/628; 428/660; 428/661; 428/684; 427/34; 427/237; 427/239; 427/250; 427/255.1; 427/255.4; 166/902; 138/143; 138/145
[58] Field of Search ............... 428/628, 660, 661, 684, 428/469; 427/34, 236, 237, 239, 250, 255.1, 255.4; 166/902; 138/143, 145

[56] References Cited

U.S. PATENT DOCUMENTS 4,364,995 12/1082 Crawford et al. .................. 428/469
4,763,729 8/1985 Ramanarayanan ................ 166/902

FOREIGN PATENT DOCUMENTS 100658 6/1985 Japan ................................. 427/255.1
130488 6/1986 Japan ................................. 427/255.1

OTHER PUBLICATIONS

Kryzhanovskii, "Two-Stage Formation of Thin Layers of Inorganic Substances", *Soviet Journal of Optical Technology*, Feb. 1978.

Primary Examiner—L. Dewayne Rutledge
Assistant Examiner—George Wyszomierski
Attorney, Agent, or Firm—Clair X. Mullen; Jay Simon

[57] ABSTRACT

A corrosion resistant article comprising a refractory metal having a sulfide coating of said refractory metal formed thereon and a method for producing the same by forming on a refractory metal substrate a sulfide coating of said refractory metal. The corrosion resistant article may be provided in a composite comprising also a metal substrate.

11 Claims, 2 Drawing Sheets

CORROSION RESISTANT ARTICLE AND METHOD OF MANUFACTURE

BACKGROUND OF THE INVENTION

1. Field of the Invention

The invention relates to a corrosion resistant article having a sulfide coating of a refractory metal formed thereon, and to a method for making this article.

2. Description of the Prior Art

In various applications, and particularly in deep, gas and oil-well production and drilling applications, there is a need for material that is corrosion resistant, and particularly resistant to corrosion caused by sulfide environments, such as those containing hydrogen sulfide. In deep-well production and drilling applications, commonly termed sour well applications, the drilling components, and particularly the tubing extending into the well, are subject to environments containing various levels of hydrogen sulfide often in combination with carbon dioxide, brine and various hydrocarbons. Tubing used for this purpose is for reasons of economy made from carbon steel. In the presence of hydrogen sulfide encountered in sour well applications, corrosion of the carbon steel occurs as a result of the iron reacting to form iron-sulfide phases, particularly on the inner wall surfaces of the tubing extending into the well and subjected to the sulfide environment.

More particularly, in sour gas environments, the iron-containing alloy, e.g. carbon steel, undergoes attack by sulfur-containing compounds such as hydrogen sulfide, resulting in the formation of a scale of various ferrous sulfide phases such as pyrite and marcasite ($FeS_2$); pyrrhotite ($Fe_{1-x}S$) and mackinawite ($Fe_{1+x}S$). In accordance with the present invention, it has been found that ferrous ions are rapidly transported through such sulfide phases, in particular the pyrrhotite phase, and react with the sulfur-containing compound at the outer surface leading to the corrosion process. It has been found that the iron ion is rapidly transferred through the iron sulfide formation, which is typically in the form of sulfide scale. The propogation or transport of the iron ion through the iron sulfided steel is relatively rapid and thus the corrosion is severe upon exposure of carbon steel tubing to hydrogen sufide environments.

SUMMARY OF THE INVENTION

It is accordingly a primary object of the present invention to provide a corrosion-resistant article that may be made from low-cost materials, including carbon steel.

A more specific object of the invention is to provide a corrosion-resistant article having a layer of a material that in the presence of corrosive media, such as hydrogen sulfide environments, forms a barrier that is resistant to corrosion.

Additional objects and advantages of the present invention will be set forth in part in the description that follows and in part will be obvious from the description or may be learned by practice of this invention. The objects and advantages of the invention may be realized and obtained by the method particularly pointed out in the appended claims.

In the broadest aspects of the invention, the corrosion-resistant article embodiment thereof comprises a refractory metal having a sulfide coating of the refractory metal formed thereon. The refractory metal may be niobium, tantalum, molybdenum, tungsten, titanium, zirconium, halfnium, vanadium or chromium.

An alternate embodiment of the invention provides a composite, corrosion-resistant article. This article has a metal substrate and a layer of a refractory metal on the substrate. The sulfide coating of the refractory metal is formed on the refractory metal layer. Preferably, the metal substrate is an iron base alloy, specifically carbon steel.

The article of the invention finds particular utility in the manufacture of tubing with the sulfide coating being on an interior portion of the tubing.

Preferably the refractory metal layer is metallurgically bonded to the substrate. This prevents the corrosive media, such as hydrogen sulfide, from penetrating between the substrate, e.g. carbon steel, and the refractory metal layer on which the refractory metal sulfide is formed.

For purposes of the invention, the term "refractory metals" may be defined as metals which form sulfides through which a cartion of the metal diffuses more slowly than iron through iron sulfide.

The refractory metal layer may be applied on the substrate by various techniques, such as cladding or coextrusion. Other suitable practices for application of the refractory metal layer may include, vapor deposition, weld deposit and plasma spraying.

Although the primary corrosive media in sour well applications for which the articles of the invention find primary utility is hydrogen sulfide, it is to be understood that these environments also contain corrosive media including carbon dioxide, brine and various hydrocarbons.

In accordance with the invention, upon the depositing of the refractory metal coating, and in the presence of hydrogen sulfide atmospheres, the sulfide coating of the refractory metal is formed in situ. This sulfide coating so formed has been found to provide a barrier or resistant layer with respect to corrosive propagation into the article.

The accompanying drawings, which are incorporated in and constitute a part of this specification, illustrate embodiments of the invention and, together with the description, serve to explain the principles and advantages of the invention.

DETAILED DESCRIPTION OF THE PREFERRED EMBODIMENTS

Reference will now be made in detail to presently preferred embodiments of the invention, examples of which are described below and illustrated in the accompanying drawing.

EXAMPLE 1

Figure 1:
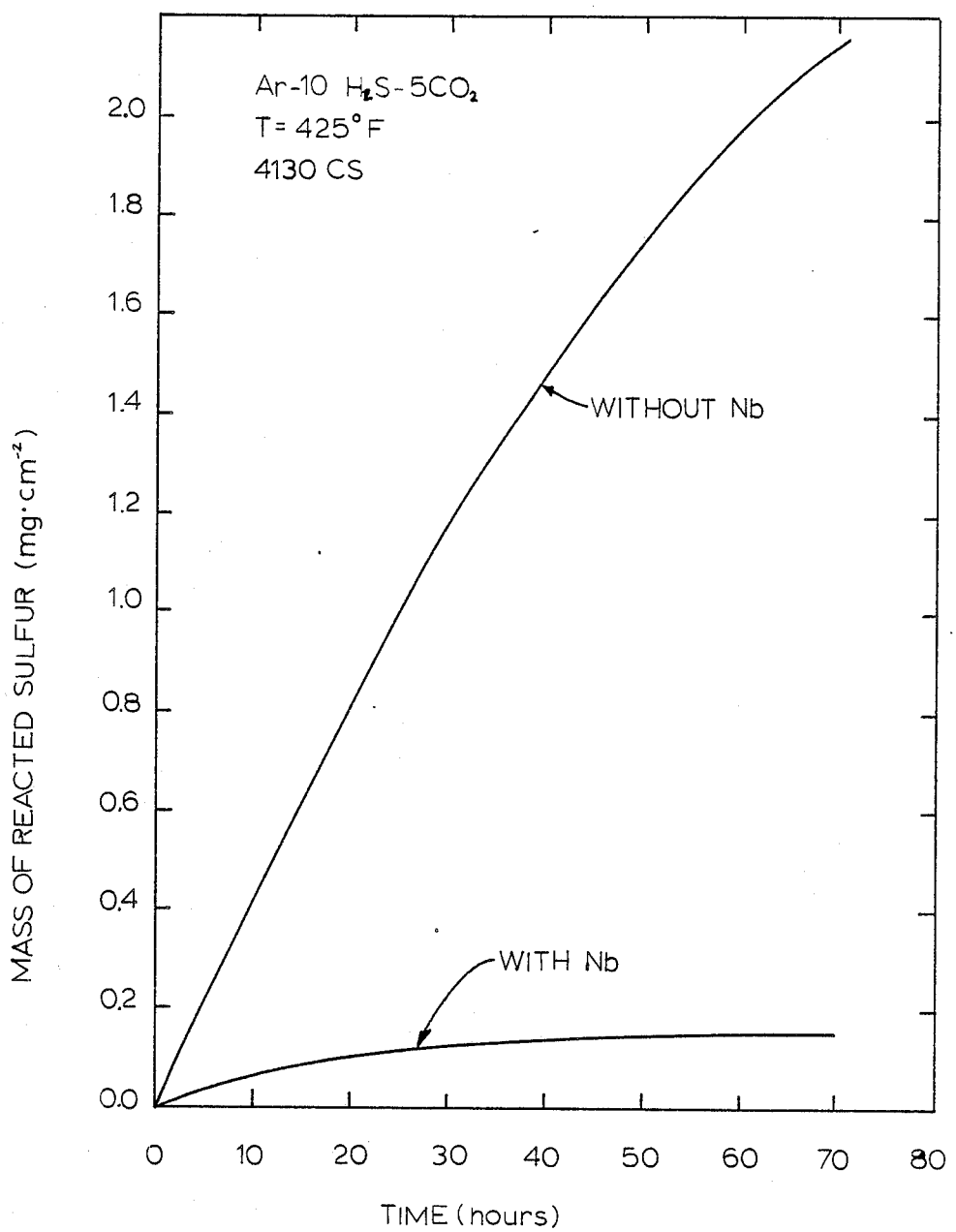
FIG. 1 of the drawings is a plot of corrosion rate on both an uncoated carbon steel surface and a niobium-coated carbon steel surface.
Figure 2:
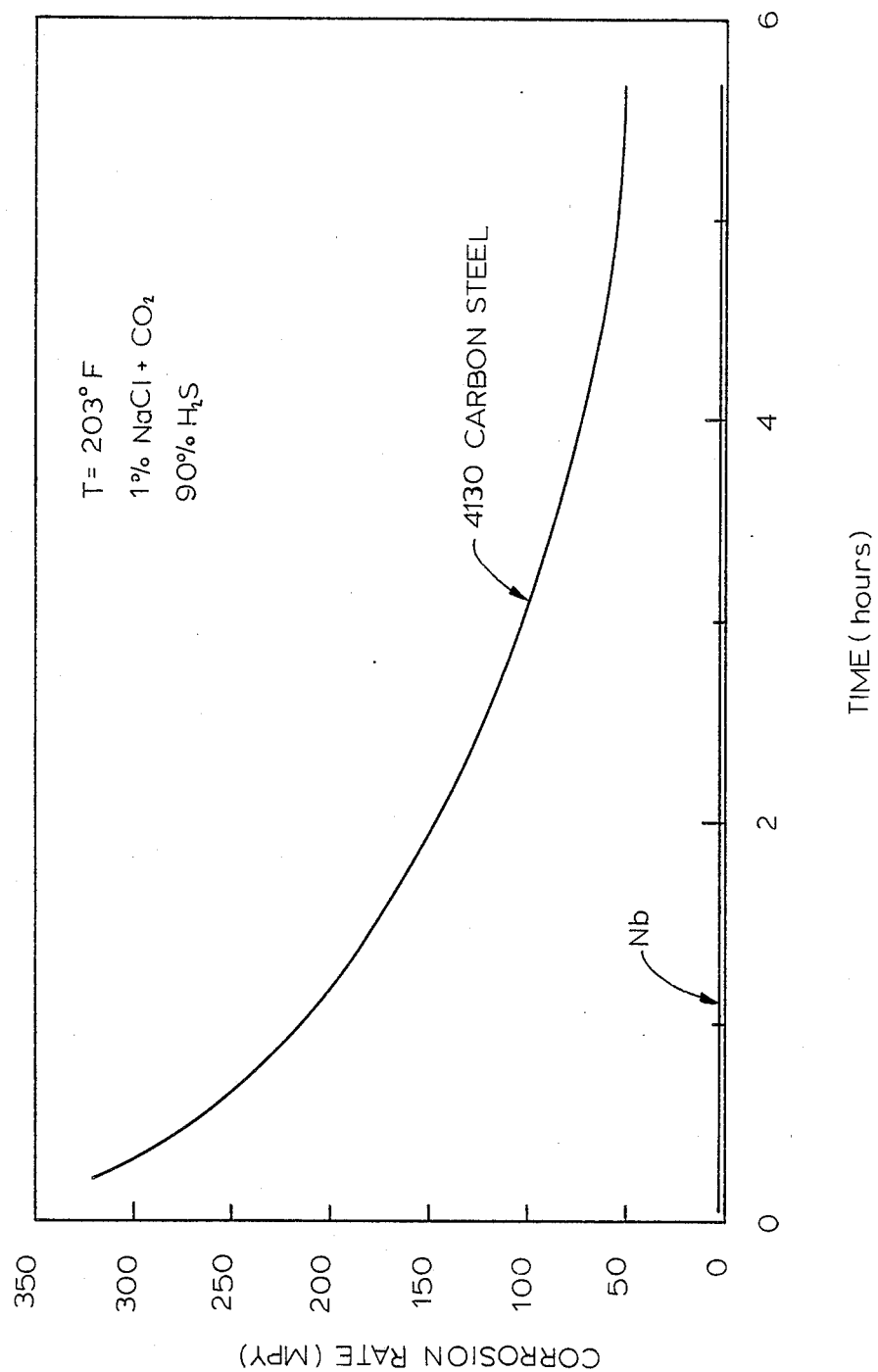
FIG. 2 is a plot comparing the corrosion resistance of conventional carbon steel with niobium.

Investigations were performed on a laboratory scale on carbon steel having a layer of niobium. A 10 $\mu$m niobium layer was applied to a 4130 carbon steel coupon surface by sputtering and was subsequently exposed to a Ar-10/$H_2S$-5/$CO_2$ environment at 425° F. The rate of sulfide growth on the coated sample is compared with that on the carbon steel surface in FIG. 1. The results show that the niobium layer is extremely effective in suppressing corrosion. FIG. 1 also shows that the corrosion resistance is due to a thin niobium sulfide surface coating.

EXAMPLE 2

Investigations were also performed on a laboratory scale on niobium exposed to a 1% aqueous sodium chloride solution saturated with carbon dioxide/90% hydrogen sulfide gas mixture at 203° F. As compared to carbon steel similarly exposed, the corrosion rate of niobium is negligible.

What is claimed is:

1. A composite, corrosion-resistant article comprising a metal substrate, a layer of a refractory metal on said substrate and a sulfide coating of said refractory metal formed on said refractory metal layer.

2. The article of claim 1 wherein said metal substrate is an iron-base alloy.

3. The article of claim 2 wherein said metal substrate is carbon steel.

4. The article of claim 2 or claim 3 wherein said refractory metal is selected from the group consisting of niobium, tantalum, molybdenum, tungsten, titanium, zirconium, hafnium, vanadium and chromium.

5. The article of claim 4 in the form of tubing with said sulfide coating being on an interior portion of said tubing.

6. The article of claim 4 wherein said refractory metal layer is metallurgically bonded to said substrate.

7. A method for producing a composite, corrosion-resistant article comprising providing a layer of a refractory metal on a metal substrate and forming a sulfide coating of said refractory metal on said layer.

8. The method of claim 7 wherein said metal substrate is an iron-base alloy.

9. The method of claim 8 wherein said metal substrate is carbon steel.

10. The method of claim 8 or claim 9 wherein said refractory metal is selected from the group consisting of niobium, tantalum, molybdenum, tungsten, titanium, zirconium, hafnium, vanadium and chromium.

11. The method of claim 10 wherein said article is formed into a tubing with said sulfide coating being on an interior portion of said tubing.

* * * * *